(12) United States Patent
Kim et al.

(10) Patent No.: US 9,896,104 B1
(45) Date of Patent: Feb. 20, 2018

(54) METHOD OF CONTROLLING COASTING OF VEHICLE

(71) Applicant: Hyundai Motor Company, Seoul (KR)

(72) Inventors: Tae Hyuck Kim, Seoul (KR); Jin Woo Cho, Uiwang-si (KR); Jae Hoon Cho, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/350,480

(22) Filed: Nov. 14, 2016

(30) Foreign Application Priority Data

Jul. 29, 2016 (KR) ........................ 10-2016-0097129

(51) Int. Cl.
*B60W 50/14* (2012.01)
*B60W 30/18* (2012.01)
*G06F 19/00* (2011.01)

(52) U.S. Cl.
CPC ...... *B60W 30/18072* (2013.01); *B60W 50/14* (2013.01); *B60W 2530/18* (2013.01); *B60W 2540/10* (2013.01); *B60W 2540/12* (2013.01); *B60W 2550/142* (2013.01); *B60W 2550/308* (2013.01)

(58) Field of Classification Search
CPC .......... B60W 30/18072; B60W 50/14; B60W 2530/18
USPC ......................................................... 701/96
See application file for complete search history.

(56) References Cited

U.S. PATENT DOCUMENTS

| 2002/0152015 A1* | 10/2002 | Seto ................... B60K 31/0008 701/96 |
| 2005/0240333 A1* | 10/2005 | Bauerle ................. F02D 11/105 701/93 |
| 2011/0174559 A1* | 7/2011 | Saito ........................ B60K 6/48 180/65.27 |
| 2013/0096792 A1* | 4/2013 | Maier ................... B60W 10/02 701/65 |

FOREIGN PATENT DOCUMENTS

| JP | 2007-291919 A | 11/2007 |
| JP | 2011-005920 A | 1/2011 |
| JP | 2011-225103 A | 11/2011 |
| JP | 2012-131292 A | 7/2012 |
| JP | 2012-214181 A | 11/2012 |
| JP | 2014-076671 A | 5/2014 |
| JP | 2016-114209 A | 6/2016 |
| KR | 10-2016-0056715 A | 5/2016 |
| KR | 10-1628563 A | 6/2016 |

* cited by examiner

*Primary Examiner* — Tan Q Nguyen
(74) *Attorney, Agent, or Firm* — Morgan, Lewis & Bockius LLP

(57) ABSTRACT

A method of controlling coasting of a vehicle, may include a preparing step of measuring an interval between an objective vehicle and a foregoing vehicle traveling ahead of the objective vehicle. a starting step of calculating a distance moved by coasting for a first predetermined time from a current speed of the objective vehicle and of starting coasting when the calculated movement distance is larger than the interval measured in the preparing step. an ending step of calculating a distance moved by coasting for a second predetermined time from the current speed of the objective vehicle after coasting is started in the starting step, and of giving an instruction to end coasting when the calculated movement is larger than the interval measured in the preparing step, in which the time T1 is longer than the time T2.

9 Claims, 3 Drawing Sheets

METHOD OF CONTROLLING COASTING OF VEHICLE

CROSS REFERENCE TO RELATED APPLICATION

The present application claims priority to Korean Patent Application No. 10-2016-0097129, filed Jul. 29, 2016, the entire contents of which is incorporated herein for all purposes by this reference.

BACKGROUND OF THE INVENTION

Field of the Invention

The present invention relates to a method of controlling coasting of a vehicle, and more particularly to a method of controlling coasting of a vehicle, whereby the method determines the start and end points of coasting.

Description of Related Art

A smart cruise control (hereafter, referred to as 'SCC') system automatically controls a vehicle so that the vehicle maintains an appropriate distance from a vehicle ahead even without specific operation by a driver. According to the SCC system, a radar unit is mounted at the front of a vehicle and measures the distance and relative speed etc. with respect to a foregoing vehicle.

Meanwhile, a technology that controls a vehicle to coast in order to improve fuel efficiency using such an SCC radar has been developed. Coasting means that a vehicle keeps moving using only inertia without additional acceleration in consideration of the distance from a foregoing vehicle or traffic signals.

Repeating excessive acceleration and braking consumes more fuel, so fuel efficiency is reduced, but coasting allows for stable traveling without unnecessary acceleration. However, many conditions including the distance from a foregoing vehicle and the vehicle speed should be considered, so it is difficult for a driver to determine the start and end points of coasting using only his/her judgment.

In the related art, a control method of determining points of entering and exiting a coasting mode and informing a driver of the points has been proposed. However, the coasting mode was too frequently turned on/off, or the turning-on/off points vary greatly depending on the situation, which is confusing for drivers.

Accordingly, there is a need for a new method of controlling coasting that is predictable to a driver and is not frequently turned on/off.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method of controlling coasting of a vehicle, whereby the method can improve fuel efficiency by providing a coasting signal to a driver at an appropriate point.

In an aspect of the present invention, there is provided a method of controlling coasting of a vehicle, the method including: a preparing step of measuring an interval between an objective vehicle and a foregoing vehicle traveling ahead of the objective vehicle; a starting step of calculating a distance moved by coasting for a predetermined time T1 on the basis of a current speed of the objective vehicle and of starting coasting when the calculated movement distance is larger than the interval measured in the preparing step; and an ending step of calculating a distance moved by coasting for a predetermined time T2 on the basis of the current speed of the objective vehicle after coasting is started in the starting step, and of giving an instruction to end coasting when the calculated movement is larger than the interval measured in the preparing step, in which the time T1 is longer than the time T2.

The preparing step may include a measuring process of measuring a relative speed and an interval between the objective vehicle and the foregoing vehicle and a determination process of determining necessary conditions for coasting; and in the determination process, the measuring process may be performed again when the relative speed measured in the measuring process is 0 or more, and the starting step may be performed when the relative speed is less than 0.

The measuring process may further measure a slope of a road on which the objective vehicle is traveling, and in the determination process, the road may be determined to be any one of an uphill road, a downhill road, and a level road on the basis of the measured slope, the measuring process may be performed again when the road is determined to be an uphill road, and the starting step may be performed when the road is determined to be a downhill road or a level road.

The starting step may include: a first comparing process of comparing a distance moved by coasting for the time T1 with the interval measured in the preparing step; an instructing process of informing a driver that it is time to start coasting when the distance moved by coasting during the time T1 is larger than the measured interval; a checking process of detecting input values by an accelerator pedal and a brake pedal after the instructing process; and a coasting-starting process of informing the driver that coasting has started when there is no input value from the accelerator pedal or the brake pedal in the checking process.

When the distance moved by coasting for the time T1, calculated in the first comparing process, is smaller than the measured interval, the preparing step may be performed again.

The preparing step may be performed again when there are input values from the accelerator pedal and the brake pedal in the checking process.

The starting step may further include a reset process of removing an alarm generated in the instructing process or the coasting-starting process before performing the preparing step again, when there are input values from the accelerator pedal and the brake pedal in the checking process.

The ending step may include: a second comparing process of comparing a calculated distance moved by coasting during a predetermined time T2 with the interval measured in the preparing step; and a coasting-ending process of informing a driver that it is time to end coasting, when the calculated distance moved by coasting during the time T is larger than the measured interval.

When the distance moved by coasting during the time T2, calculated in the second comparing process, is smaller than the measured interval, the checking step may be performed again.

The method of controlling coasting of a vehicle of the present invention has the following effects.

First, a driver can intuitively understand the coasting start and end points, so the convenience of the driver can be improved.

Second, it is possible to contribute to improving the fuel efficiency of a vehicle by prompting to perform coasting.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
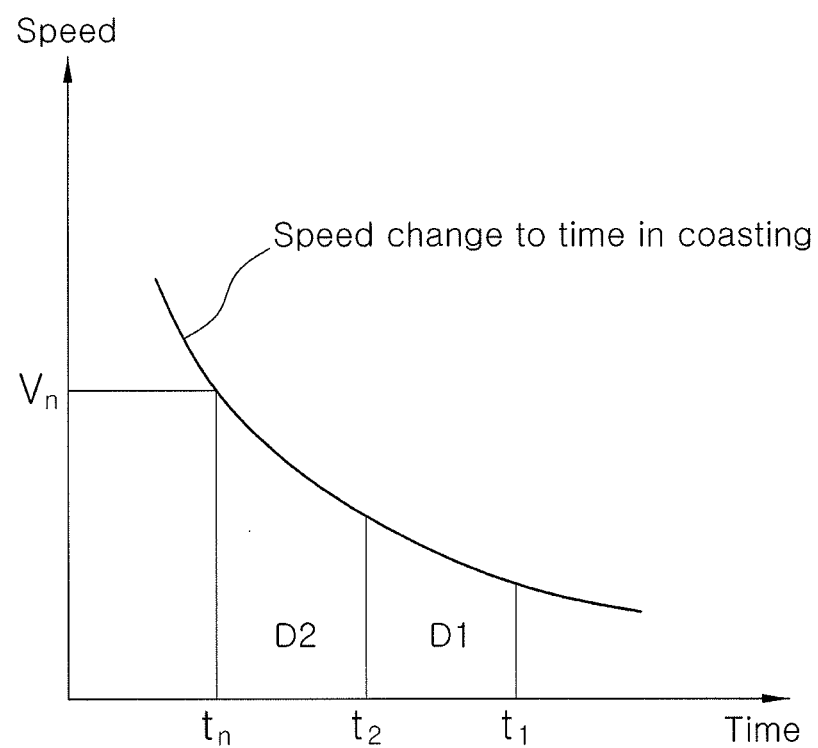
FIG. 1 is a graph showing a speed change and a movement distance for a predetermined time from T1 to T2 of a coasting vehicle.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Terminologies stated herein are used only for describing specific embodiments without limiting the present invention. The singular terms used herein include plural terms unless phrases express opposite meanings clearly.

Though not differently defined, all the terms, including technical terms and scientific terms used hereafter, have the same meanings as those that those skilled in the art generally understand The terms defined in dictionaries should be construed as having meanings corresponding to the related prior art documents and those stated herein and should not be construed as being ideal or official, if not defined.

Hereinafter, a method of controlling coasting of a vehicle according to an exemplary embodiment an exemplary embodiment of the present invention is described with reference to the accompanying drawings.

Figure 2:
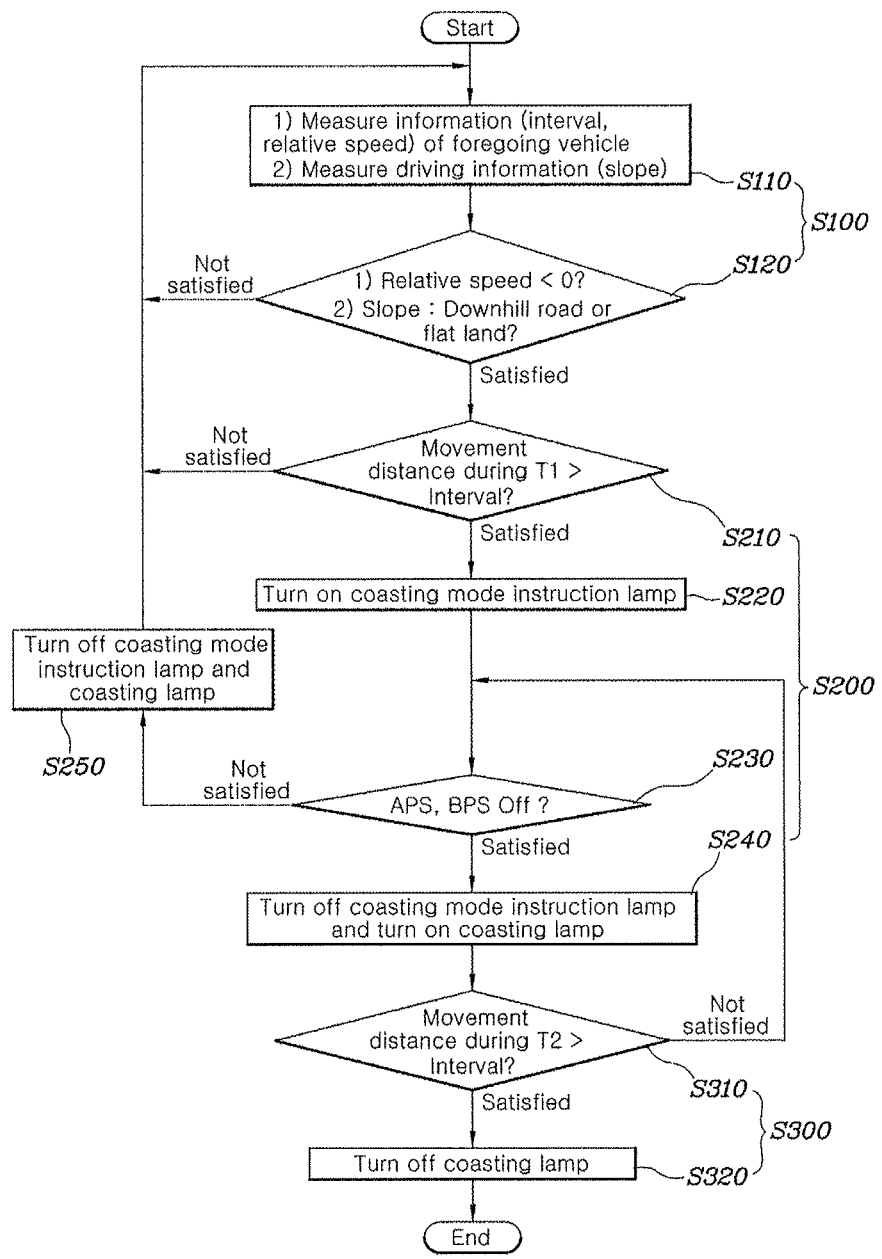
FIG. 2 is a flowchart according to an embodiment of the present invention.
Figure 3:
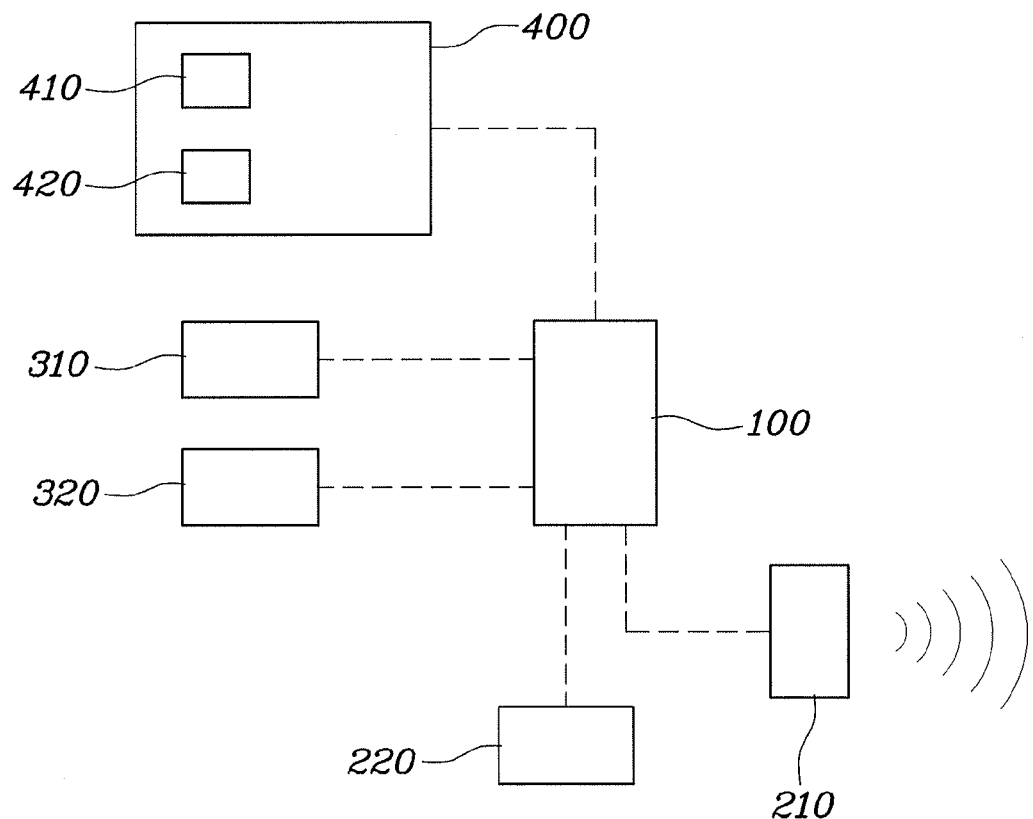
FIG. 3 is a view showing the configuration according to an embodiment of the present invention.

As shown in FIGS. 1 to 3, the present invention broadly includes a preparing step S100, a starting step S200, and an ending step S300.

The steps are briefly respectively described hereafter. The preparing step S100 collects and determines various items of information for starting coasting. When predetermined conditions are satisfied, coasting is started, but when the conditions are not satisfied, the preparing step S100 is repeated and the current state is maintained.

When the conditions are satisfied in the preparing step S100, the starting step S200 is started, and a driver is prompted to start coasting.

After coasting is started in the starting step S200, when predetermined conditions are satisfied, the driver is instructed to stop coasting in the ending step S300.

The subject of 'determining' and 'instructing' in the steps is a controller 100 in a vehicle, for example, an ECU. The subject of determination and instruction to be described hereafter is the same.

Hereafter, the steps are described in more detail on the basis of the relationship between a vehicle to which the present invention is applied (hereafter, referred to as a 'objective vehicle') and another vehicle traveling ahead of the objective vehicle (hereafter, referred to as a 'foregoing vehicle').

First, the preparing step S100 includes a measuring process S110 for continuously measuring the interval and relative speed between an objective vehicle and a foregoing vehicle and the state of a road surface, particularly, the slope of a road, and a determination process S120 for determining whether to start the starting step S200 or repeat the measuring process S110 on the basis of the data obtained in the measuring process S110.

In the measuring process S110, the device and method for measuring the interval and relative speed between an objective vehicle and a foregoing vehicle are not specifically limited, but a distance-measuring unit 210 such as the SCC radar may be used.

A gyroscope in a vehicle, or a slope-measuring unit 220, such as a navigation system, providing the shapes of road surfaces may be used to measure the slope of roads. Accordingly, when a measured slope is in a predetermined range, for example, −10°~+10°, the road can be determined to be a level road, when the slope is larger than this range, the road can be determined to be an uphill road, and when the slope is smaller than the range, the road can be determined to be a downhill road.

The determination process S120 performs the following determination using the data collected through the measuring process S110.

First, when the relative speed between an objective vehicle and a foregoing vehicle is 0 or more, that is, when the speeds of an objective vehicle and a foregoing vehicle are the same or the speed of the foregoing vehicle is higher, the measuring process S110 is performed without performing the starting step S200.

Since the speed of a vehicle that is coasting gradually decreases, when an objective vehicle starts coasting with the speed of foregoing vehicle being higher than or the same as the speed of the objective vehicle, the interval between the objective vehicle and the foregoing vehicle will gradually increase.

It is preferable for the interval between vehicles to be maintained while the vehicles are traveling, so when the relative speed between an objective vehicle and a foregoing vehicle is 0, it is preferable to supply additional power in order to maintain or increase the speed without starting to coast.

Further, when an objective vehicle is moving or when the road that an objective vehicle is about to enter is an uphill road, the measuring process S110 is repeated without performing the starting step S200.

Power must be continuously supplied to travel up an uphill road, but coasting is performed without power, and thus it is impossible to coast up an uphill road. Accordingly, when an object vehicle is traveling on an uphill road or an object vehicle is expected to enter an uphill road while coasting, it is preferable not to start coasting.

That is, when the relative speed between an objective vehicle and a foregoing vehicle is 0 or more or a road is uphill, the measuring process S110 is repeated without performing the starting step S200.

On the other hand, when the relative speed between an objective vehicle and a foregoing vehicle is 0 or less and a road is flat or downhill, the starting step S200 is performed.

The starting step S200 includes, a first comparing process S210 of comparing the distance (D1+D2) that an objective vehicle runs after a predetermined time T1 from the current time with the interval between the objective vehicle and a foregoing vehicle, when the objective vehicle starts coasting at the current speed. an instructing process S220 of informing the driver of the starting point of coasting when the distance (D1+D2) is determined to be larger than the interval between the objective vehicle and the foregoing vehicle in the first comparing process S210. a checking process S230 of checking whether the driver has released an accelerator pedal 320 and a brake pedal 310 by detecting input values. a coasting-starting process S240 of informing the driver that coasting has been started when it is determined that the driver has released the accelerator pedal 320 and the brake pedal 310.

The first comparing process 210 is performed in accordance with a coasting reduction graph according to the current speed of an objective vehicle, but the graph is not limited to that shown in FIG. 1 and may be changed in various ways, depending on the kind of vehicle.

As shown in the figure, a reference point Tn is determined on the basis of the current speed Vn of an objective vehicle. A movement distance from the reference point Tn to a point T1 is defined as the area (D1+D2) under the graph between the reference point Tn and the point T1.

The calculated movement distance (D1+D2) and the interval between the objective vehicle and the foregoing vehicle are compared, and when the movement distance (D1+D2) is larger, the instructing process S220 is performed.

The instructing process S220 is a process of informing a driver that it is time to start coasting, and it may be achieved, for example, by showing a notice that instructs the driver to take his/her feet off the accelerator pedal and the brake pedal for coasting on a dashboard 400, turning on a coasting instruction lamp 410 such as an icon, or generating a voice message.

In the checking process S230, it is checked whether the driver has recognized that it is time to start coasting and has released the accelerator pedal 320 and the brake pedal 310.

In order to check the above, for example, it is possible to detect input values from the accelerator pedal and the brake pedal using an accelerator position sensor (APS) and a brake position sensor (BPS) and to check whether the driver is operating the accelerator pedal or the brake pedal.

When it is determined that the driver has released the accelerator pedal and the brake pedal, it is possible to inform the driver that coasting has been started by turning on the coasting lamp 420, showing the start of coasting, on the dashboard or generating a voice in the coasting-starting process S240.

When the conditions described above are not satisfied in the processes of the starting step S200, the preparing step is performed again.

In detail, when the movement distance (D1+D2) calculated in the first comparing process S210 is smaller than the current interval between the objective vehicle and the foregoing vehicle or when the operation of the accelerator pedal or the brake pedal is found in the checking process S230, the process returns to the preparing step S100 and repeats the steps.

The method may further include a reset process S250 that discontinues the alarm that instructs a driver to start coasting or informs the driver of coasting, when operation of the accelerator pedal or the brake pedal is found in the checking process S230, after which the process returns to the preparing step S100.

In the reset process S250, for example, the coasting instruction lamp 410, for prompting for coasting, or the coasting lamp 420, showing that the vehicle is coasting, may be turned off. The driver can clearly recognize that coasting is stopped through the reset process S250.

The ending step S300 includes a second comparing process S310 and a coasting-ending process S320.

The second comparing process S310 is similar to the first comparing process S210. However, the movement distance (D1+D2) during the time T1 is compared with the interval between an objective vehicle and a foregoing vehicle in the first comparing process S210, but the movement distance during the time T2 is compared with the interval between an objective vehicle and a foregoing vehicle in the second comparing process S310. The time T2 should be set shorter than the time T1.

When the movement distance D2 calculated in the second comparing process S310 is larger than the interval between the objective vehicle and the foregoing vehicle, the coasting-ending process S320 is performed, but when the movement distance D2 calculated in the second comparing process S310 is smaller than the interval between the objective vehicle and the foregoing vehicle, the checking process S230 is performed again.

The coasting-ending process S320 instructs the driver to operate the accelerator pedal or the brake pedal by indicating that it is time to end coasting. Accordingly, the driver recognizes that it is time to operate the accelerator pedal and the brake pedal in his/her judgment.

In order to give those instructions to a driver, it may be possible to turn off the coasting lamp 420 or generate a voice.

The determination of the point of ending coasting through the second comparing process S310 serves to end coasting before the objective vehicle approaches the foregoing vehicle and potentially collides with the foregoing vehicle. This will be described below.

The times T1 and T2 are not specifically limited, but for example, the time T1 may be 9-11 seconds and the time T2 may be 4-6 seconds.

A detailed example of operation of the present invention under various situations is described hereafter.

In the preparing step S100, whether to perform the starting step S200 is determined in consideration of the relative speed and interval between an objective vehicle and a foregoing vehicle and the slope of a road etc. Although the coasting start and end points are determined by continuously considering the relative speed of an objective vehicle and a foregoing vehicle in the related art, these points are considered only for starting coasting and are not considered for ending coasting in an exemplary embodiment of the present invention.

In the starting step S200, when the total distance (D1+D2) moved by coasting during the time T1 from the current speed Vn, which is the start speed of the objective vehicle, is longer than the interval between the objective vehicle and the foregoing vehicle, the driver is instructed to start coasting.

In other words, when the time the objective vehicle takes to reach the current position of the foregoing vehicle after starting coasting is shorter than the time T1, an instruction for coasting is given.

According to an exemplary embodiment of the present invention, after coasting is started, when a driver operates the accelerator pedal or the brake pedal or when the total movement distance D2 by coasting for the time T2 is larger than the interval between an objective vehicle and a foregoing vehicle, that is, when the time the objective vehicle takes to reach the current position of the foregoing vehicle after starting coasting is shorter than the time T2, coasting is ended in the ending step S300.

Although coasting is repeatedly started and ended in consideration of the speed relative to a foregoing vehicle before and after coasting in the related art, the relative speed is not considered after coasting is started in an exemplary embodiment of the present invention, so an unnecessary signal for ending coasting is not generated during coasting.

According to an exemplary embodiment of the present invention, the condition for ending coasting is only the case when the interval between an objective vehicle and a foregoing vehicle is smaller than the total movement distance D2 during the time T2, that is, the case when the objective vehicle approaches the foregoing vehicle and risks causing a collision, so that a driver receiving an ending signal can prevent a collision by operating the brake pedal.

On the other hand, when the foregoing vehicle accelerates and the interval between the objective vehicle and the foregoing vehicle increases while the objective vehicle is coasting, coasting is not automatically ended, but the driver can end coasting by recognizing that the foregoing vehicle has moved ahead and operating the accelerator pedal.

According to the method of the present invention, a driver can intuitively understand the coasting start and end points and unnecessary repetition of coasting is minimized, so confusion and fatigue of the driver can be minimized.

Although exemplary embodiments of the present invention have been described above with reference to the accompanying drawings, those skilled in the art will understand that the present invention may be implemented in various ways without changing the necessary features or the spirit of the prevent invention.

Therefore, it should be understood that the exemplary embodiments are not limiting but illustrative in all aspects. The scope of the present invention is defined not by the specification, but by the following claims, and all changes and modifications obtained from the meaning and range of claims and equivalent concepts should be construed as being included in the scope of the present invention.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling coasting of a vehicle, the method comprising:
   a preparing step of measuring an interval between an objective vehicle and a foregoing vehicle traveling ahead of the objective vehicle;
   a starting step of determining a distance moved by coasting during a first predetermined time from a current speed of the objective vehicle and of starting coasting when the determined distance moved is larger than the interval measured in the preparing step; and
   an ending step of determining a distance moved by coasting during a second predetermined time from the current speed of the objective vehicle after coasting is started in the starting step, and of giving an instruction to end coasting when the determined distance moved is larger than the interval measured in the preparing step,
   wherein the first predetermined time is longer than the second predetermined time.

2. The method of claim 1, wherein the preparing step includes a measuring process of measuring a relative speed and an interval between the objective vehicle and the foregoing vehicle and a determination process of determining whether to perform the starting step based on data obtained in the measuring process, and
   in the determination process, the measuring process is performed again when the relative speed measured in the measuring process is 0 or more, and the starting step is performed when the relative speed is less than 0.

3. The method of claim 2, wherein the measuring process further measures a slope of a road on which the objective vehicle travels, and
   in the determination process, the road is determined to be one of an uphill road, a downhill road, and a level road based on the measured slope, the measuring process is performed again when the road is determined to be an uphill road, and the starting step is performed when the road is determined to be a downhill road or a level road.

4. The method of claim 1, wherein the starting step includes:
   a first comparing process of comparing a distance moved by coasting during the first predetermined time with the interval measured in the preparing step;
   an instructing process of informing a driver that it is time to start coasting when the distance moved by coasting during the first predetermined time is larger than the measured interval;
   a checking process of detecting input values from an accelerator pedal and a brake pedal after the instructing process; and a coasting-starting process of informing the driver that coasting has started when there is no input value from the accelerator pedal or the brake pedal in the checking process.

5. The method of claim 4, wherein when the distance moved by coasting during the first predetermined time, determined in the first comparing process, is smaller than the measured interval, the preparing step is performed again.

6. The method of claim 4, wherein the preparing step is performed again when there are input values from the accelerator pedal and the brake pedal in the checking process.

7. The method of claim 6, wherein the starting step further includes a reset process of discontinuing an alarm generated in the instructing process or the coasting-starting process before performing the preparing step again, when there are input values from the accelerator pedal and the brake pedal in the checking process.

8. The method of claim 4, wherein the ending step includes,
- a second comparing process of comparing a determined distance moved by coasting for a the second predetermined time with the interval measured in the preparing step; and
- a coasting-ending process of informing the driver that it is time to end coasting when the determined distance moved by coasting during the second predetermined time is larger than the measured interval.

9. The method of claim 8, wherein when the distance moved by coasting during the second predetermined time, determined in the second comparing process, is smaller than the measured interval, the checking step is performed again.

\* \* \* \* \*